United States Patent [19]

Bouche

[11] Patent Number: 5,033,285

[45] Date of Patent: Jul. 23, 1991

[54] APPARATUS FOR CALIBRATING TRANSDUCERS

[76] Inventor: Raymond R. Bouche, 9419 Cordero Ave., Tujunga, Calif. 91042

[21] Appl. No.: 497,404

[22] Filed: Mar. 22, 1990

[51] Int. Cl.⁵ .................................... G01P 21/00
[52] U.S. Cl. .................................... 73/1 DV
[58] Field of Search .............. 73/1 DV, 1 D, 2, 668, 73/662, 665

[56] References Cited

U.S. PATENT DOCUMENTS 3,830,091 8/1974 Sinsky ............................. 73/1 DV

OTHER PUBLICATIONS

Bouch et al., Endevco Brochere; Pasedena, CA; No. 216.

Primary Examiner—Robert Raevis
Attorney, Agent, or Firm—James E. Brunton

[57] ABSTRACT

An improved shock and vibration isolation mount assembly for use in connection with an apparatus for calibrating transducers. The improved isolation mount assembly substantially eliminates unwanted discontinuities in the sinusoidal wave form of the apparatus resulting from poor alignment of the armature of the apparatus within an air bearing provided in the stator of the apparatus.

7 Claims, 3 Drawing Sheets

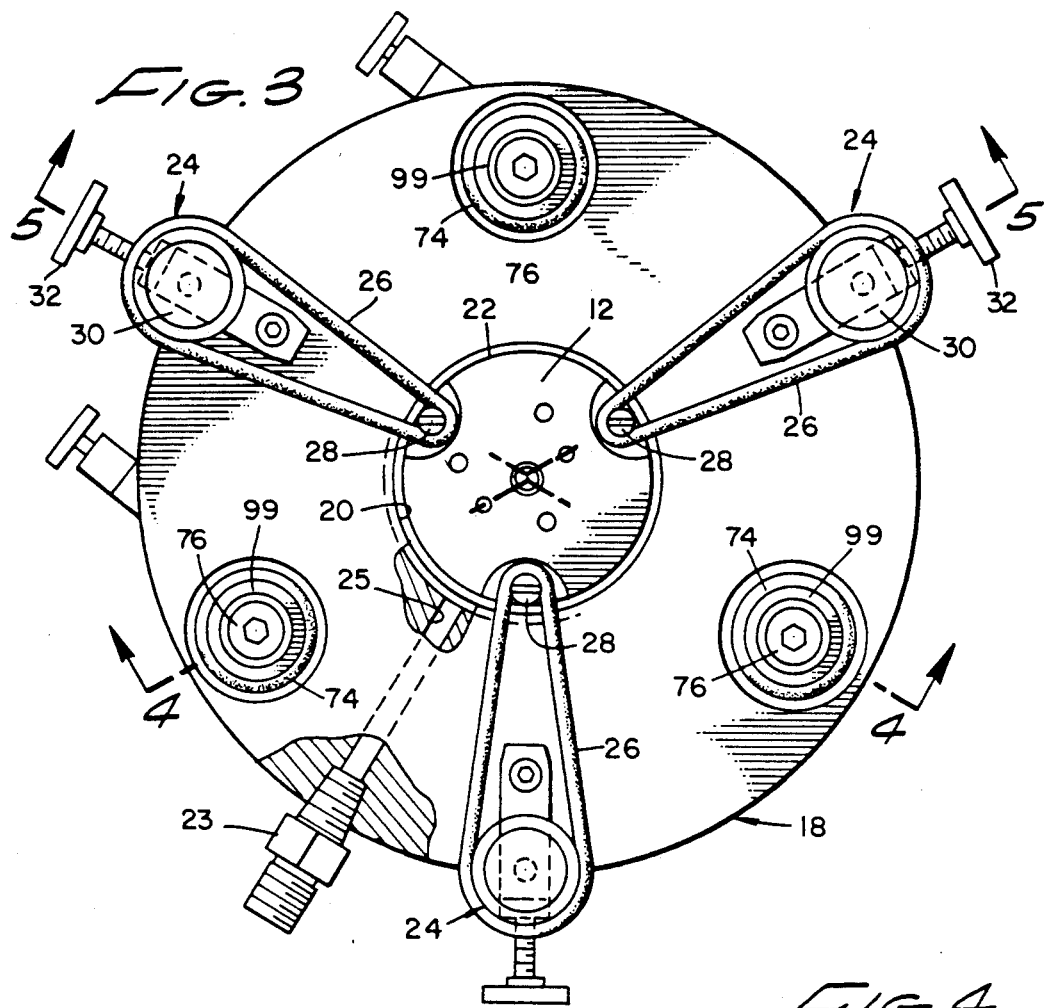
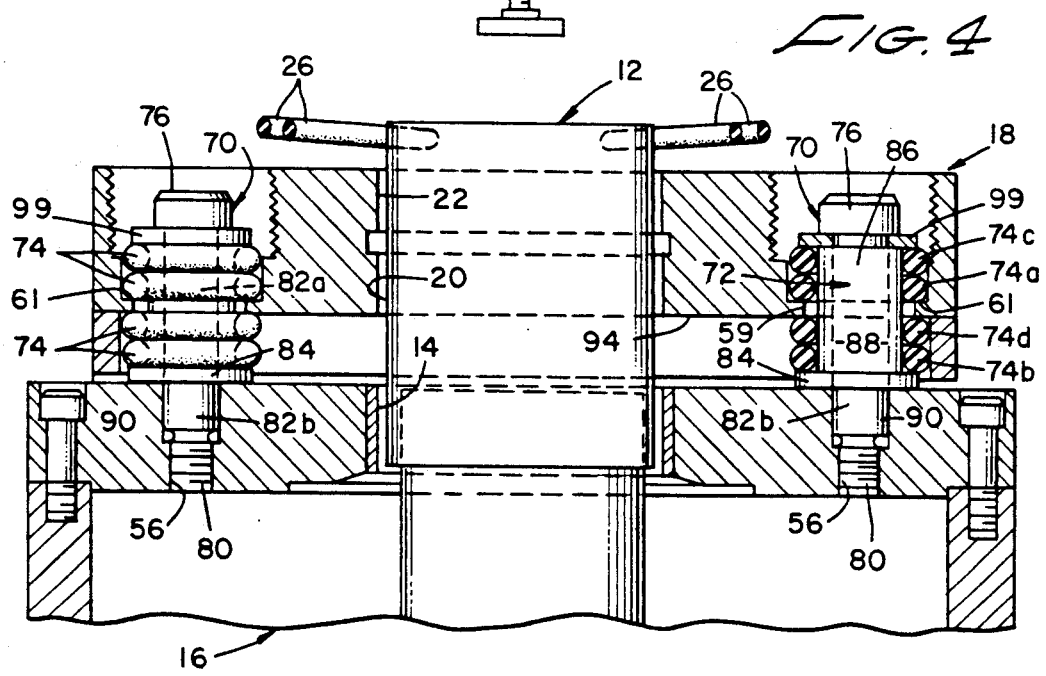

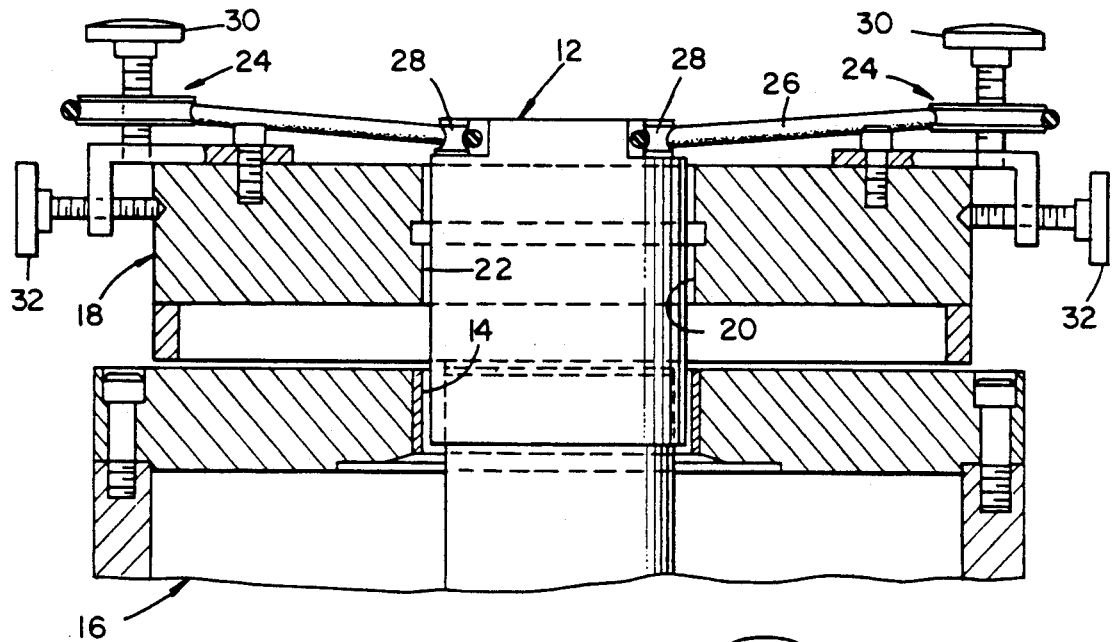
FIG. 5
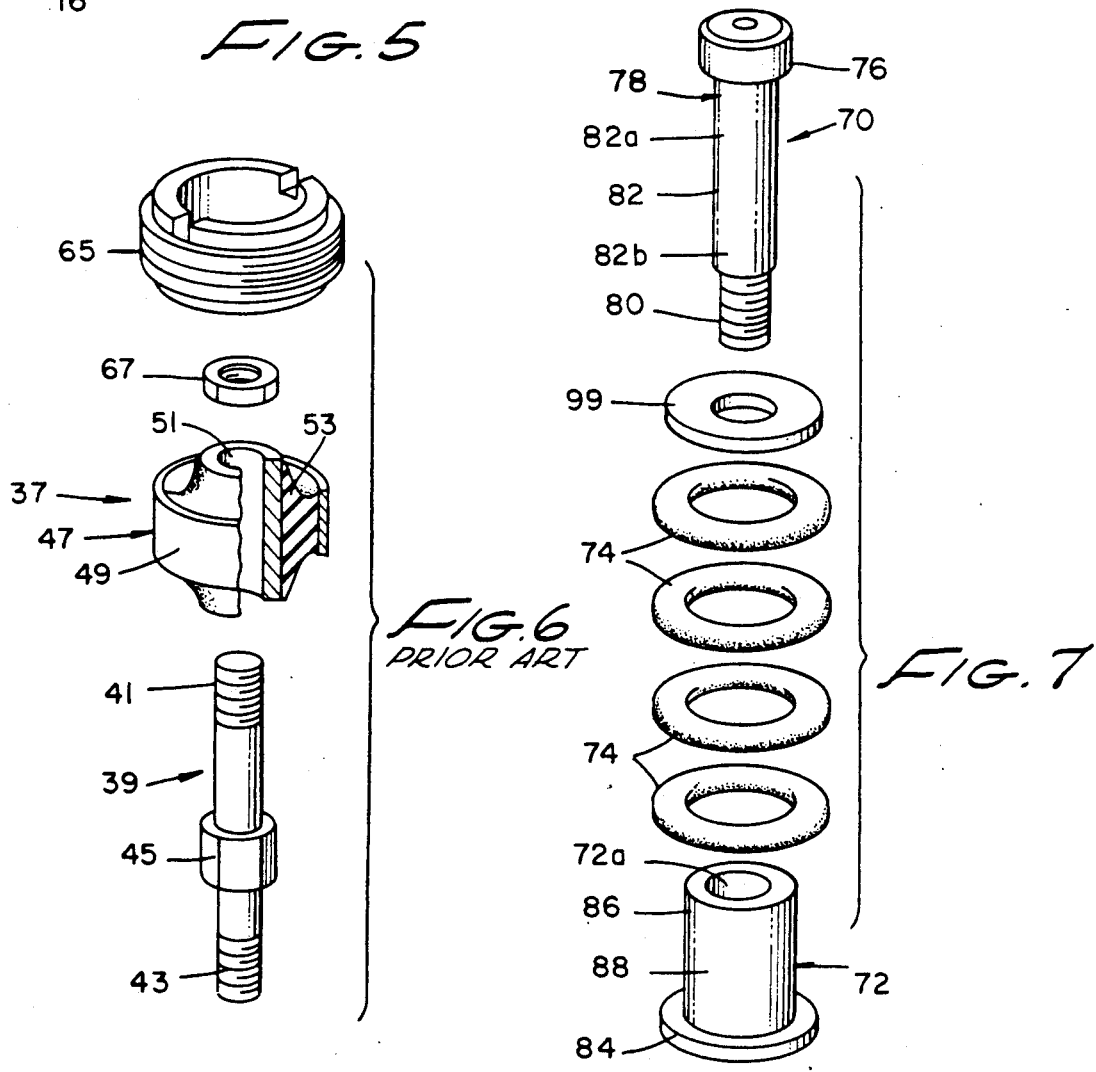
FIG. 6 PRIOR ART
FIG. 7

APPARATUS FOR CALIBRATING TRANSDUCERS

BACKGROUND OF THE INVENTION

Field of the Invention

The present invention relates generally to calibration devices. More particularly, the invention concerns an apparatus for calibrating shock and vibration measuring transducers.

DISCUSSION OF THE INVENTION

Introduction

Transducers used for measuring shock and vibration motions include accelerometers, velocity pickups and displacement vibration measuring devices. For many years, such transducers have been calibrated using electrodynamic shakers.

The electrodynamic shaker uses an inductive coil in its reciprocal sense, to produce rather than measure vibration. The coil is wound on an armature and becomes the moving element of the shaker. The coil is positioned in the gap of a strong magnet. Motion is produced by applying a sinusoidal alternating current to the coil. The resulting alternating magnetic field produced by the coil interacts with the steady flux of the magnetic field of the magnet to produce sinusoidal vibration. It is important for precise calibration to have little or no distortion in this sinusoidal motion.

Unfortunately most of the shakers used in the 1950s and 1960s had rather poor sinusoidal motion as many of the desired operating frequencies. Much effort was expended for more than two decades to improve the quality of the sinusoidal motion of these shakers and to extend the operating frequency range. A significant breakthrough was made by the present inventor in about 1972, when a shaker was designed which used an armature fabricated from virtually pure beryllium and included a built-in primary standard accelerometer. The armature was guided in an precisely configured air-bearing. These features resulted in virtually no acceleration waveform distortion in the sinusoidal motion at any frequency in the range from 10 Hz to 10,000 Hz.

However, a drawback of the aforementioned prior art device resided in the fact that it was very difficult to consistently manufacture the air-bearing in a manner to prevent occurrence of sharp discontinuities in the sinusoidal waveform. After several years of manufacturing the prior art shaker, the present inventor discovered that these discontinuities resulted from poor alignment of the armature within the air bearing of the stator. It was determined that the main culprit causing the misalignment problem was the rubber isolation mounts which were used to support the stator on the magnet pot-structure and to isolate the stator from unwanted vibration. It is the rather elegant solution of this problem that constitutes the thrust of the present invention.

As will be discussed in greater detail hereinafter, because of the very substantial cost of the prior art shakers and due to the fact that large numbers of such shakers are presently in use, an additional object of the present invention was to solve the misalignment problem in a manner to enable simple and inexpensive retrofit of the shakers already in service.

SUMMARY OF THE INVENTION

An object of the present invention is to provide in an electrodynamic shaker a novel stator mounting assembly which substantially eliminates discontinuities in the sinusoidal waveform resulting from poor alignment of the armature within the air bearing of the stator.

Another object of the invention is to provide a novel stator mounting assembly which can readily replace the stator mounting assemblies which exist in the prior art shakers thereby permitting inexpensive and expeditious retrofit of presently existing shakers.

Another object of the invention is to provide a stator mounting assembly of the character described which minimizes the number of parts of the mounting assembly of the prior shakers which must be replaced.

Another object of the invention is to provide a stator mounting assembly that can be used to retrofit the prior art shakers in a manner to eliminate the parts of the prior art mounting assembly which are the most difficult and costly to manufacture.

Still another object of the invention is to provide a stator mounting assembly of the character described in the preceding paragraphs which is inexpensive to fabricate, reliable in use and readily usable in expensively retrofitting prior art shakers.

BRIEF DESCRIPTION OF THE DRAWINGS

FIG. 3 is a top plan view, partly broken away to show internal construction of the calibration apparatus of the present invention.

FIG. 4 is a cross-sectional view taken along lines 4—4 of FIG. 3.

FIG. 5 is a cross-sectional view taken along lines 5—5 of FIG. 3.

FIG. 6 is a generally perspective exploded view of the isolation mount assembly of the prior art structure.

FIG. 7 is a generally perspective exploded view of the improved isolation mount assembly of the present invention.

DESCRIPTION OF THE INVENTION

Figure 1:
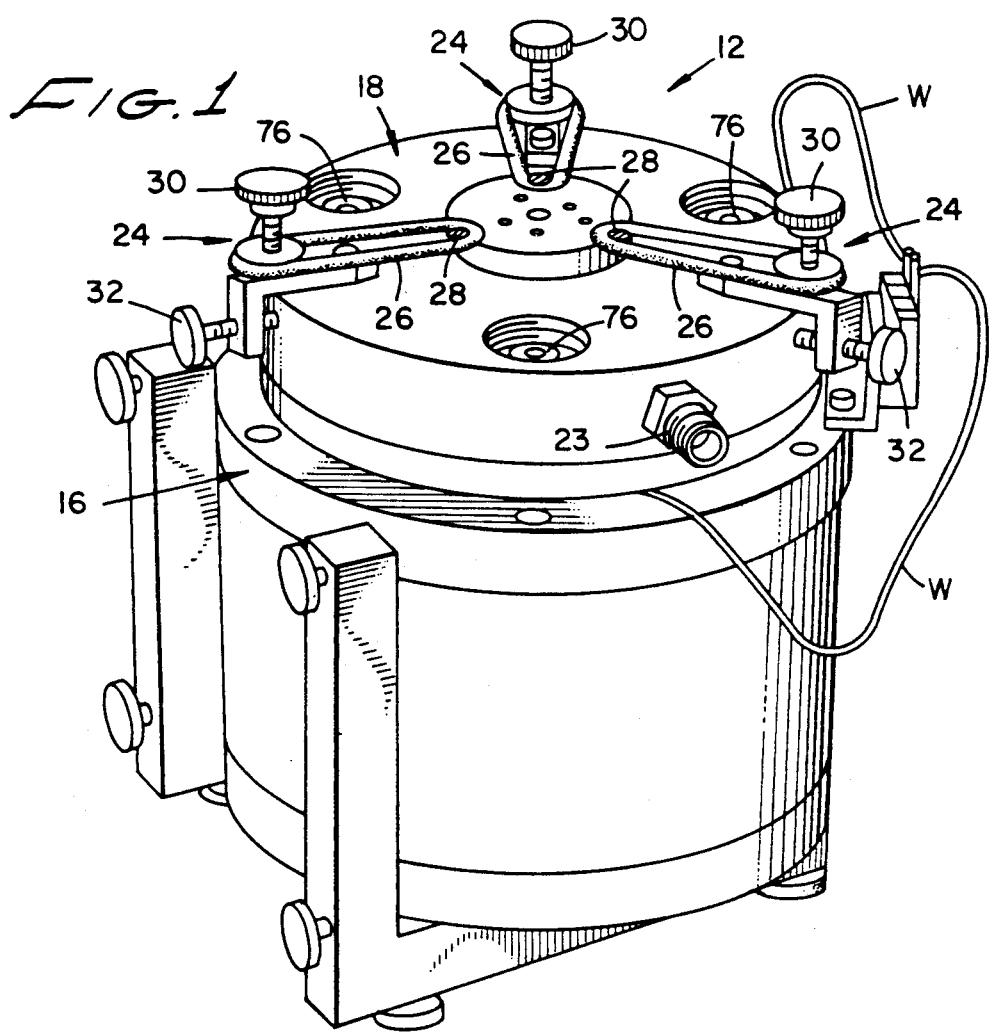
FIG. 1 is a generally perspective view of the apparatus of the present invention for calibrating a transducer.
Figure 2:
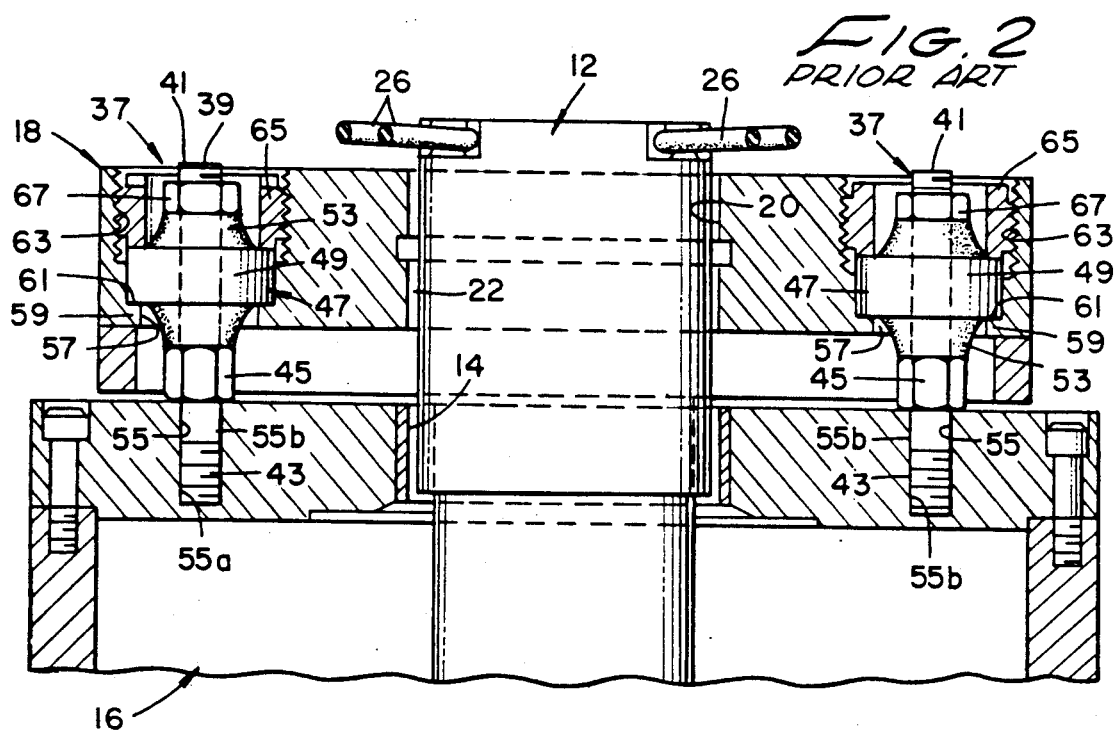
FIG. 2 is a side elevational, cross-sectional view of a prior art device similar in construction of the apparatus of the present invention but utilizing isolation mounts of different designs for interconnecting the stator of the apparatus with the magnet.

Referring to the drawings and particularly to FIGS. 1 and 2, the apparatus of the present invention, as well as the prior art apparatus shown in FIG. 2, for calibrating a transducer includes a cylindrically shaped moving element or armature 12 onto which a coil of wire is wound at one end. The other end of the armature is provided with means for attaching both a standard and a test transducer such as an accelerometer (not shown). The coil end of the armature 12 is suspended in a cylindrical gap 14 of a permanent magnet 16 (FIG. 2). As alternating current in any desired frequency is passed through the coil of wire wound on the armature, an alternating electromagnetic field is produced. This alternating field interacts with the constant magnetic field of the permanent magnet 16 to produce sinusoidal motion along the axis of the cylindrical coil. In accurately calibrating a transducer, it is vitally important to have little or no distortion in this sinusoidal motion.

In the apparatus of the present invention, as well as in the prior art apparatus, a stator means, including a flat stator plate 18, is superimposed over magnet 16 for supporting armature 12 in a manner such that the first end thereof about which the coil of wire is there wrapped is received within the cylindrical gap 14 of the magnet in a manner such that the armature can freely oscillate within the gap. Stator plate 18 includes a central aperture 20 for closely receiving armature 12 and cooperates with armature 12 to define an air-bearing 22 which is disposed between the outer surface of armature 12 and the inner surface of aperture 20.

As best seen in FIGS. 1 and 3, armature 12 is held precisely centered within air gap 22 by means of three circumferentially spaced adjustment mechanism generally designated by the numeral 24. (See also FIGS. 3 and 5.) These mechanisms form no part of the present invention and will not be described in detail. Suffice to say that each of the adjustment mechanisms includes an elastomeric belt 26 that circumscribes a connector 28 disposed proximate the periphery of armature 12. Adjusting knobs 30 and 32 are provided for adjusting the elevation of the armature relative to plate 18 as well as for centering the armature within air bearing 22. The adjustment mechanism also supports the weight of the armature plus the weight of the standard transducer and the transducer being calibrated. Means for conducting air under pressure into gap 20 is provided in the form of a fitting 23 connected to a radially inwardly extending conduit 25.

The apparatus of the present invention, like the prior art apparatus, also includes means for receiving and comparing signals from the standard accelerometer and the transducer being calibrated during operation of the apparatus. These means, which once again form no part of the present invention, include connector wires W which pass between stator plate 18 and the top of magnet 16.

Experience has shown that the biggest culprit in causing distortion of the sinusoidal motion in the apparatus is the rubber shock and vibration isolation mount assemblies used in the prior art structure. These assemblies are illustrated in FIGS. 2 and 6 and are generally designated by the numeral 37. The thrust of the present invention relates to the replacement of these isolation mount assemblies with new and novel isolation mount assemblies of unique construction, the details of which will presently be described.

Turning particularly to FIGS. 2 and 6, the three isolation mount assemblies of the prior art shaker, each comprises a connector or fastener member 39 having threaded portions at its first and second ends 41 and 43 respectively and an enlarged diameter nut like portion 45 disposed between first and second ends 41 and 43. CLosely receivable over first end 41 of connector member 39 is an isolation mount 47. Mount 47 includes a cylindrically shaped outer ring or sleeve 49 which is coaxially aligned with an inner cylindrically shaped member 51. The inner diameter of member 51 is slightly larger than the outer diameter of the first portion 41 of connector member 39. Disposed intermediate ring 49 and number 51 is a molded rubber core 53. It is core 53 which provides shock and vibration isolation of the stator means of the prior art apparatus.

Turning particularly to FIG. 2, magnet 16 is provided with three circumferentially spaced bores 55 each having a lower threaded portion 55a and an upper non-threaded portion 55b. As indicated in FIG. 2, threaded portion 43 of each connector member 39 is threadably receivable within bores 55 provided in magnet 16 with enlarged diameter portion 45 (shown here as a hexnut) of connector number 39 functioning as a stop. Stator plate 18 is also provided with three circumferentially spaced bores 57, which will index with bores 55. Each bore 57 is counterbored to produce an annular shaped wall portion 59 having an upper surface 61. As best seen in FIG. 2, this counterbore, which defines upper surface 61, is slightly larger in diameter than the outer diameter of ring 49 of the isolation mount 47 so that ring 49 will be closely received within the counterbore. Disposed above this counterbore is a larger diameter, internally threaded counterbore 63 which is adapted to threadably receive an externally threaded ring shaped securement member 65 which forms a part of the isolation mount assembly illustrated in FIG. 6. Also forming a part of the isolation mount assembly is an internally threaded hexnut 67 which is receivable over second threaded end 41 of connector member 39. As illustrated in FIG. 2, members 65 and 67 function to hold ring 49 of each isolation mount 47 in engagement with surfaces 61 of the annular shaped wall portions 59 of stator plate 18.

The unnecessary complexity of the prior art isolation mount assemblies 37 makes their manufacture difficult, costly and time consuming. Experience has shown that the rubber core portion 53 of the isolation mount assemblies 37 are most difficult to mold or machine within the very close tolerances required in order to maintain alignment and concentricity between the inner cylindrical member 51 and the outer ring 49. Further, it is most difficult to achieve the desired coaxial alignment of connector members 39 within threaded bores 55a by means of a threaded connection alone.

Because of the alignment problems presented by the prior art isolation mount assemblies, it was extremely difficult, it not impossible, to eliminate discontinuities in the sinusoidal motion of the apparatus at operating frequencies below 1,000 Hz. Accordingly, it was common practice in assembling the prior art apparatus to spend between 30 and 50 man hours simply trying to achieve the necessary alignment of stator ring 18 with respect to magnet 16 in order to eliminate unacceptable discontinuities in the sinusoidal motion of the armature. Frequently isolation mounts 37 as well as connector numbers 39 had to be repeatedly discarded and replaced with new assemblies in order to achieve the precise alignment necessary to proper operation of the apparatus. The extremely difficult problems associated with the manufacture of the prior art isolation mount assemblies coupled with the difficulties in their use in assembling the stator means to the magnet, made their redesign mandatory.

As previously mentioned, in pursuing the redesign of the isolation mount assemblies, considerable effort was directed, not only to eliminating the aforementioned alignment problems, but also to developing isolation mount assemblies which could replace the isolation mount assemblies in existing units with a minimum of difficulty and expense.

Following a discussion of the details of construction of the improved isolation mount assemblies of the invention, the unique manner in which the prior art units are retrofitted with the improved isolation mount assemblies will be discussed.

Referring to FIG. 7, each of the improved isolation mount assemblies of the present invention comprises a fastener or connector member 70, a sleeve 72 closely receivable over the shank portion of member 70 and four, resiliently deformable elastomeric ring shaped members 74. Fastener member 70 includes a head 76, a first portion 78 disposed adjacent head 76, a threaded lower end portion 80 and an intermediate portion 82 comprising portions 82a and 82b disposed between first portion 70 and threaded portion 80. Sleeve 72 is provided with an annular shaped lower end portion 84 and includes first and second axially spaced apart outer wall portions or surfaces 86 and 88.

Turning now to FIG. 4, the assembly of the improved isolation mount assembly of the present invention with the stator plate 18 and the magnet 16 is there illustrated. As there shown, previously identified bores 55 are each redrilled, rethreaded and counterbored to define a lower threaded portion 56 and an enlarged diameter portion 90. In assembling each of the isolation mount assemblies of the present invention, a pair of ring member 74 are first placed over sleeve 72 so that they circumscribe sleeve portion 88. The assemblages thus formed are positioned on the upper surface of magnet 16 with the annular portions 84 of the sleeves in engagement with the upper surface of the magnet and with central bore 72a of each sleeve in alignment with one of the enlarged diameter portions 90 formed in magnet 16. Next stator plate 18 is positioned over the three sleeves 72 in the manner shown in FIG. 4 with the lower surface 94 of annular shaped wall portion 59 of plate 18 resting on the upper ring shaped member 74. A second pair of ring shaped members 74 are then slipped over portion 86 of each sleeve 72 with the lower ring shaped member resting on the upper surface 61 of annular shaped portion 59. Washers 99 are then placed over each of the upper ring shaped members 74 and each connector member 70 is inserted through its respective washer 99, through central bore 72a of its cooperating sleeve 72, and then into the appropriate threaded bores 56 provided in magnet 16. As the connector members 70 are snugged down, slight deformation of the ring shaped members 74 will occur.

With the apparatus assembled in the manner illustrated in FIG. 4, the first shank portion 82 of each connector member 70 is precisely received within the enlarged diameter portions 90 formed in the magnet 16. This close tolerance fit of portions 82 within enlarged portions 90 precisely aligns each member 70 with respect to magnet 16. As member 70 is snugged down, a first elastomeric ring shaped member 74a (FIG. 4) is placed in pressural engagement with upper surface 61 of annular shaped wall 59. Similarly, a second ring shaped member 74b, which circumscribes portion 88 of sleeve 72, is placed in pressural engagement with annular shaped portion 84 of sleeve 72. In the completed assemblage, a third ring shaped member 74c, which circumscribes portion 86 of the sleeve, is securely disposed intermediate washer 99 and first ring member 74a, and, in similar fashion, a fourth ring shaped member 74d, which circumscribes portion 88 of the sleeve is securely disposed intermediate second ring member 74b and the lower surface of annular shaped portion 59 of stator plate 18. With this unique arrangement, stator plate 18 is maintained in perfect alignment with magnet 16 and is completely isolated from unwanted shock and vibration.

A comparison of FIGS. 2 and 4 illustrates the elegant simplicity of the retrofit effort required to replace the prior art isolation mount assemblies already in the field with the isolation mount assemblies of the present invention. More particularly, because of the unique construction of the improved isolation mount assemblies of the invention, all that need be done in retrofitting the apparatus is to demagnetize magnet 16, redrill and rethread bore 55 to form a slightly larger diameter bore 56. Bore 56 is then precisely counterbored to produce cylindrical portion 90 very closely receives lower portion 82 of connector members 70. Afterward the magnet 16 is remagnitized.

The installation of the improved isolation mount assemblies into the prior art apparatus solves the difficult problems recognized by the inventor. For example, no longer is it necessary to expand 30 to 50 man hours to accomplish the correct alignment of stator plate 18 with magnet 16. With the improved isolation of mount assemblies of the present invention, this alignment step can be accomplished in less than about one hour without the necessity for trial and error substitution of component parts as was previously necessary to achieve the required alignment. Additionally, experience has shown that the improved isolation mounts of the present invention provide for superior isolation against shock and vibration than did the prior art assemblies. As an added bonus, the improved assemblies of the invention are much easier to manufacture and assemble and can be produced at substantially lower than the isolation mount assemblies of the prior art apparatus.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for calibrating a transducer of the character having a generally cylindrically shaped armature having first and second ends and including means for connecting thereto both the transducer to be calibrated and a standard transducer, and means for receiving and comparing signals from the standard transducer and the transducer to be calibrated during operation of the apparatus, said apparatus comprising:

(a) a magnet having a generally cylindrical gap for receiving said first end of said armature for oscillatory movement thereof within said gap, said magnet having a plurality of bores, circumscribing said gap, each said bore having a first threaded portion and an enlarged diameter portion disposed proximate said threaded portion;

(b) a stator superimposed over said magnet for supporting said armature in a manner such that said first end thereof is received within said cylindrical gap of said magnet, said stator including a flat plate having a central aperture for closely receiving said armature and a plurality of circumferentially spaced bores therethrough, each said bore being counterbored to produce an annular shaped wall, circumscribing said bore, said annular shaped wall having upper and lower, generally planar surfaces; and (c) interconnection means for interconnecting said stator with said magnet, said interconnection means comprising at least two isolation mount assemblies, each said isolation mount assembly including:

(i) a fastener member having a head, a first portion adjacent said head a threaded shank portion threadably receivable within said first threaded portion of said magnet and an intermediate portion disposed between said first portion and said threaded shank portion, part of said intermediate portion being closely received within said enlarged diameter portion of said bore in said magnet;

(ii) a sleeve closely receivable over said first portion of said fastener member, said sleeve having an annular shaped portion and including first and second axially spaced outer wall portions, said first outer wall portion being receivable within one of said counterbores in said flat plate of said stator and said second outer wall portion being disposed intermediate said flat plate of said stator and said magnet;

(iii) a first resiliently deformable elastomeric ring shaped member circumscribing said first outer wall portion of said sleeve and being in engagement with said upper surface of said annular shaped wall of said flat plate of said stator; and (iv) a second resiliently deformable elastomeric ring shaped member circumscribing said second outer wall portion of said sleeve and being in engagement with said annular shaped portion of said sleeve.

2. An apparatus as defined in claim 1 in which said annular shaped portion of said sleeve is in engagement with said magnet.

3. An apparatus as defined in claim 1 further including a third resiliently deformable ring shaped member circumscribing said first outer wall portion of said sleeve and being in engagement with said first ring shaped member and a further resiliently deformable ring shaped member circumscribing said second outer wall portion of said sleeve and being in engagement with said second ring shaped member.

4. An apparatus as defined in claim 3 in which said fourth ring shaped member is also in engagement with said lower surface of said annular shaped wall of said flat plate of said stator.

5. An apparatus as defined in claim 4 further including a washer disposed intermediate said head of said fastener member and said third ring shaped member.

6. An apparatus for calibrating a transducer of the character having a generally cylindrically shaped armature including means for connecting thereto both the transducer to be calibrated and a standard transducer, and means for receiving and comparing signals from the standard transducer and the transducer to be calibrated during operation of the apparatus, said apparatus comprising:

(a) a magnet having a generally cylindrical gap for receiving a first end of said armature for reciprocal movement thereof within said gap, said magnet having a plurality of bores circumscribing said gap, each said bore having a first threaded portion and an enlarged diameter portion disposed proximate said threaded portion;

(b) a stator superimposed over said magnet for supporting said armature in a manner such that said first end thereof is received within said cylindrical gap of said magnet, said stator means including a flat plate having a central aperture for closely receiving said armature and a plurality of circumferentially spaced bores therethrough, each said bore being counterbored to produce an annular shaped wall, circumscribing said bore, said annular shaped wall having upper and lower, generally planar surfaces; and (c) three circumferentially spaced isolation mount assemblies for interconnecting said stator with said magnet, each said isolation amount assembly including:

(i) a fastener member having a head, a first portion adjacent said head, a threaded shank portion threadably receivable within said first threaded portion of said magnet and an intermediate portion disposed between said first portion and said threaded shank portion, part of said intermediate portion being closely received within said enlarged diameter portion of said bore in said magnet;

(ii) a washer receivable over said fastener member for engagement with said head;

(iii) a sleeve closely receivable over said first portion of said fastener member, said sleeve having an annular shaped portion and including first and second axially spaced outer wall portions, said first outer wall portion being receivable within one of said counterbores in said flat plate of said stator and said second outer wall portion being disposed intermediate said flat plate of said stator and said magnet;

(iv) a first pair of resiliently deformable elastomeric ring shaped members circumscribing said first outer wall portion of said sleeve, one of said ring shaped members being in engagement with said upper surface of said annular shaped wall of said flat plate of said stator and the other of said ring shaped members being in engagement with said washer; and (v) a second pair of resiliently deformable elastomeric ring shaped members circumscribing said second outer wall portion of said sleeve, one of said ring shaped members being in engagement with said annular shaped portion of said sleeve and the other of said ring shaped members being in engagement with said lower surface of said annular shaped wall of said flat plate of said stator.

7. An apparatus as defined in claim 6 in which said annular shaped portion of said sleeve is in engagement with said magnet.

* * * * *